(12) United States Patent
Suga

(10) Patent No.: US 10,160,257 B2
(45) Date of Patent: Dec. 25, 2018

(54) ORIENTATION CHANGING APPARATUS AND ENCLOSING-AND-SEALING SYSTEM

(71) Applicant: FUJI XEROX CO., LTD., Tokyo (JP)

(72) Inventor: Mutsuo Suga, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/665,480

(22) Filed: Aug. 1, 2017

(65) Prior Publication Data

US 2018/0272794 A1   Sep. 27, 2018

(30) Foreign Application Priority Data

Mar. 24, 2017  (JP) ................................ 2017-060125

(51) Int. Cl.
| | |
|---|---|
| B65G 47/24 | (2006.01) |
| B43M 5/04 | (2006.01) |
| B65G 47/76 | (2006.01) |
| B65H 33/06 | (2006.01) |
| B43M 3/04 | (2006.01) |
| B65H 29/40 | (2006.01) |

(52) U.S. Cl.
CPC ............ B43M 5/042 (2013.01); B65G 47/24 (2013.01); B65G 47/766 (2013.01); B65H 33/06 (2013.01); B43M 3/045 (2013.01); *B65G 2201/0285* (2013.01); *B65H 29/40* (2013.01); *B65H 2511/212* (2013.01); *B65H 2513/42* (2013.01)

(58) Field of Classification Search
CPC ........................................................ B65G 47/24
USPC ........................................ 198/400, 410, 412
See application file for complete search history.

(56) References Cited

U.S. PATENT DOCUMENTS

| | | | | |
|---|---|---|---|---|
| 6,968,763 | B2* | 11/2005 | Chapin | ................ H05K 3/0097 |
| | | | | 53/255 |
| 9,802,720 | B2* | 10/2017 | Baylor | ..................... B65B 5/06 |

FOREIGN PATENT DOCUMENTS

| | | |
|---|---|---|
| JP | 2010-535679 A | 11/2010 |
| WO | 2009-019560 A2 | 2/2009 |

* cited by examiner

*Primary Examiner* — Gene O Crawford
*Assistant Examiner* — Lester III Rushin
(74) *Attorney, Agent, or Firm* — Sughrue Mion, PLLC

(57) ABSTRACT

An orientation changing apparatus includes a transport path along which a transport object is transported and that includes a portion having a space; a changing unit that changes an orientation of the transport object transported toward the space, the changing unit changing the orientation in the space by applying a rotational force to the transport object in a direction that crosses a transporting direction in which the transport object is transported; and a receiving unit that receives the transport object after the orientation of the transport object is changed by the changing unit.

16 Claims, 14 Drawing Sheets

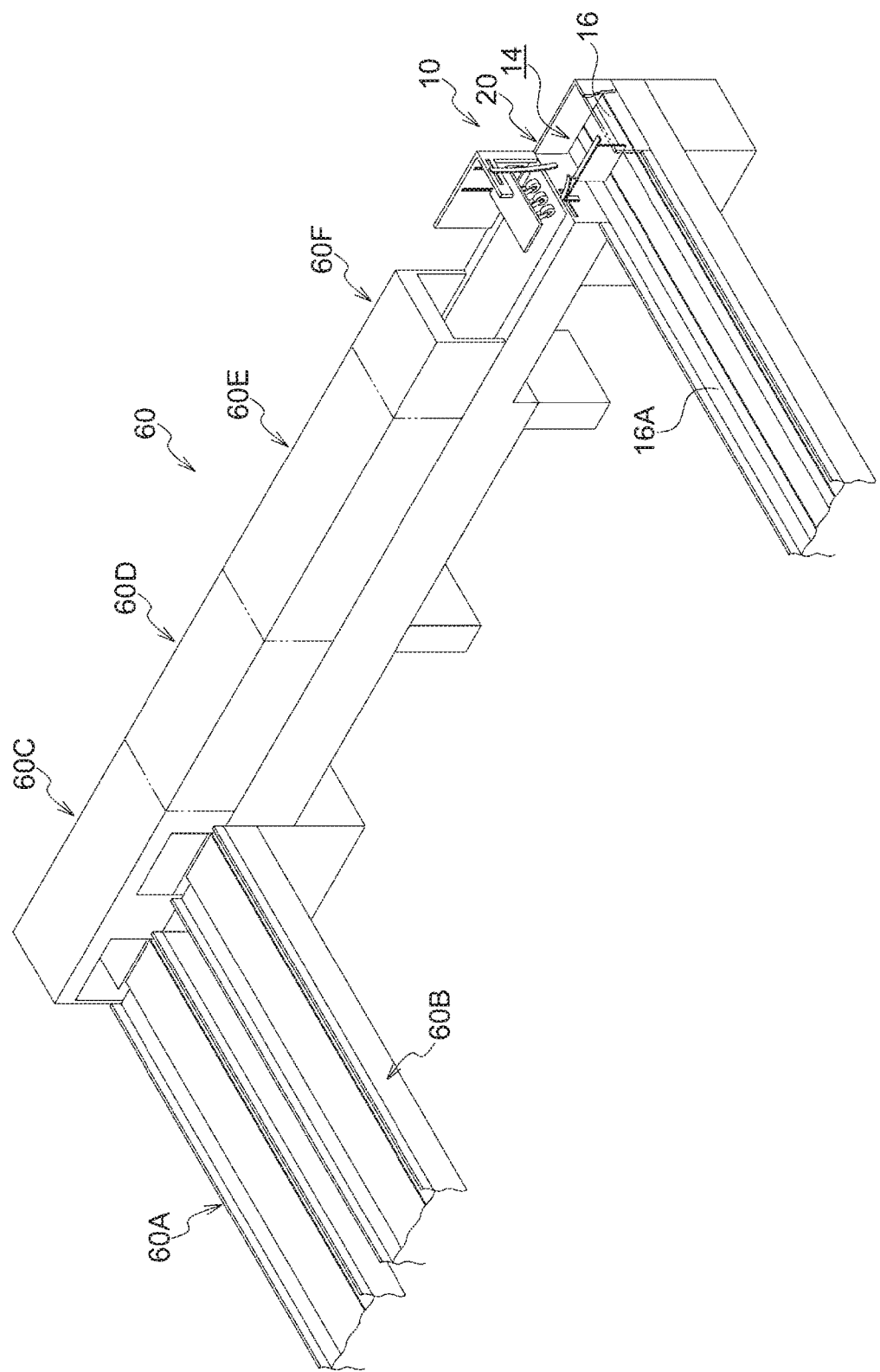

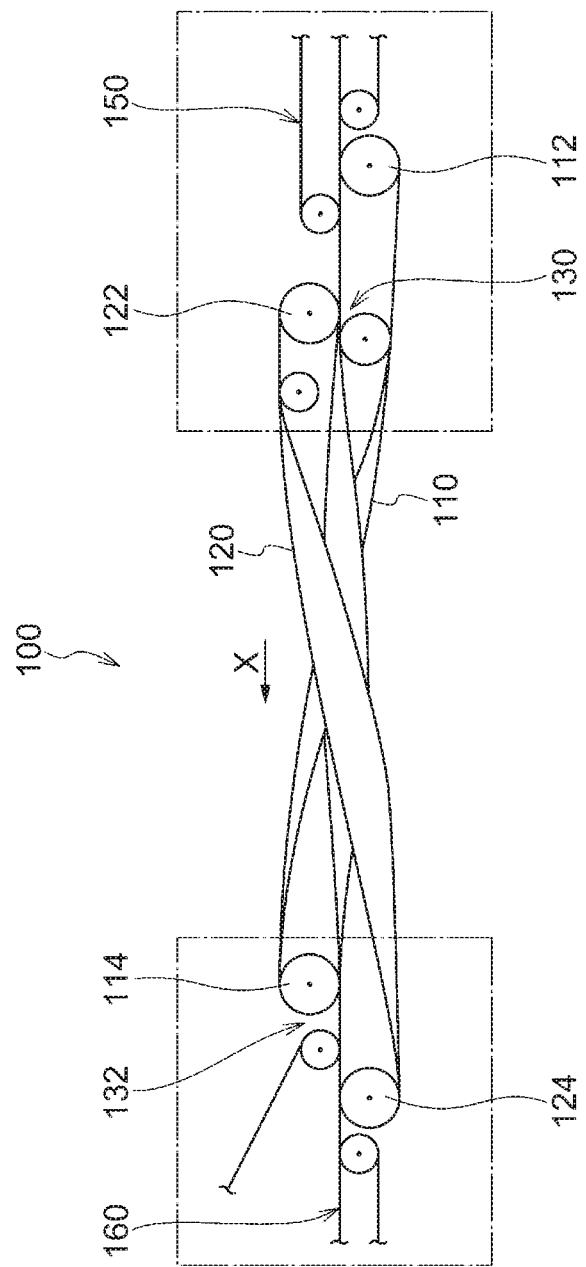

ORIENTATION CHANGING APPARATUS AND ENCLOSING-AND-SEALING SYSTEM

CROSS-REFERENCE TO RELATED APPLICATIONS

This application is based on and claims priority under 35 USC 119 from Japanese Patent Application No. 2017-060125 filed Mar. 24, 2017.

BACKGROUND

Technical Field

The present invention relates to an orientation changing apparatus and an enclosing-and-sealing system.

Summary

According to an aspect of the invention, there is provided an orientation changing apparatus including a transport path along which a transport object is transported and that includes a portion having a space; a changing unit that changes an orientation of the transport object transported toward the space, the changing unit changing the orientation in the space by applying a rotational force to the transport object in a direction that crosses a transporting direction in which the transport object is transported; and a receiving unit that receives the transport object after the orientation of the transport object is changed by the changing unit.

BRIEF DESCRIPTION OF THE DRAWINGS

An exemplary embodiment of the present invention will be described in detail based on the following figures, wherein:

FIG. 13 is a schematic perspective view illustrating the overall structure of an enclosing-and-sealing system including the orientation changing apparatus according to the exemplary embodiment; and FIG. 14 is a schematic side view illustrating a related portion of a transport device according to a comparative example.

DETAILED DESCRIPTION

Exemplary Embodiment

Figure 1:
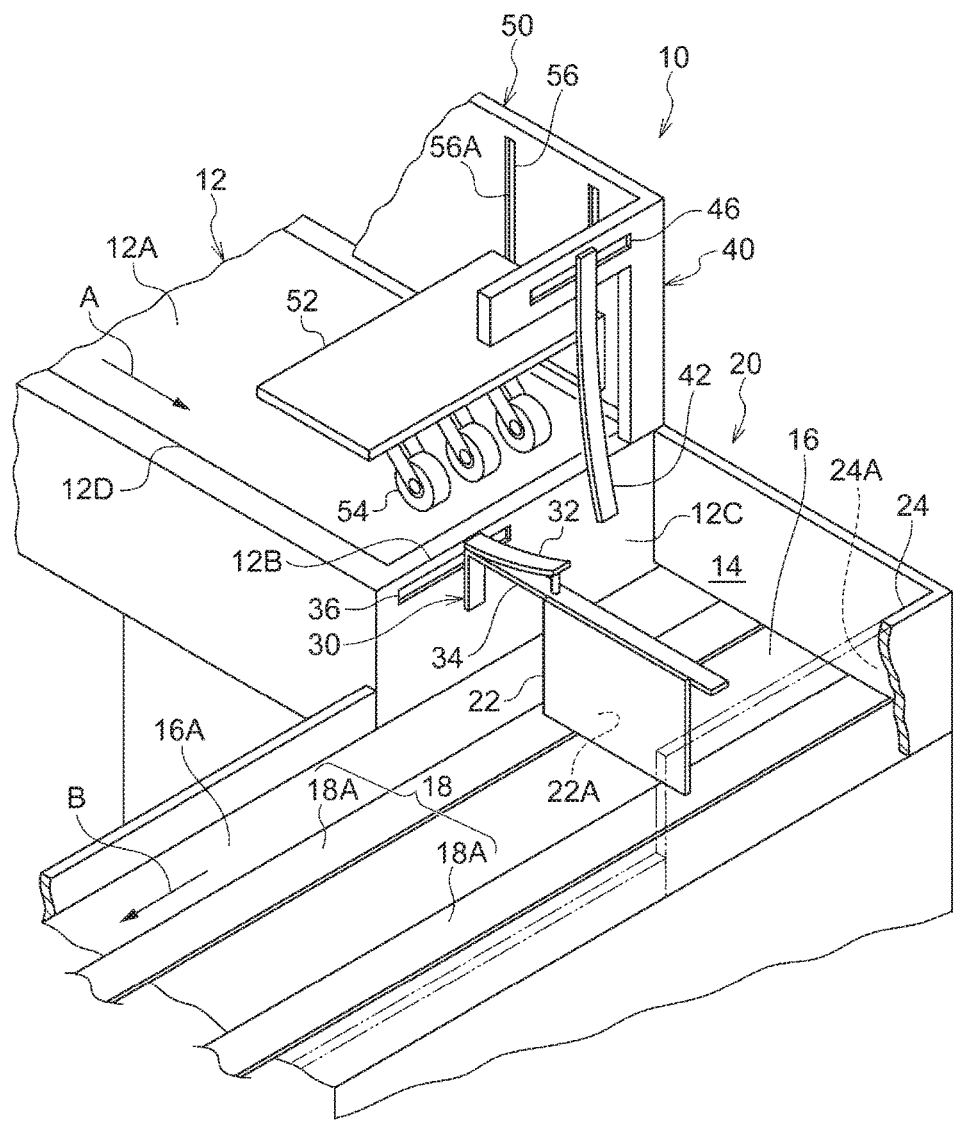
FIG. 1 is a perspective view illustrating the overall structure of an orientation changing apparatus according to an exemplary embodiment.

An orientation changing apparatus for a transport object and an enclosing-and-sealing system according to an exemplary embodiment will be described with reference to FIGS. 1 to 12.

In the drawings, arrow A indicates the direction in which an envelope W is transported when an orientation thereof is to be changed, and arrow B indicates the direction in which the envelope W is transported after the orientation thereof is changed.

Overall Structure of Orientation Changing Apparatus

Figure 4:
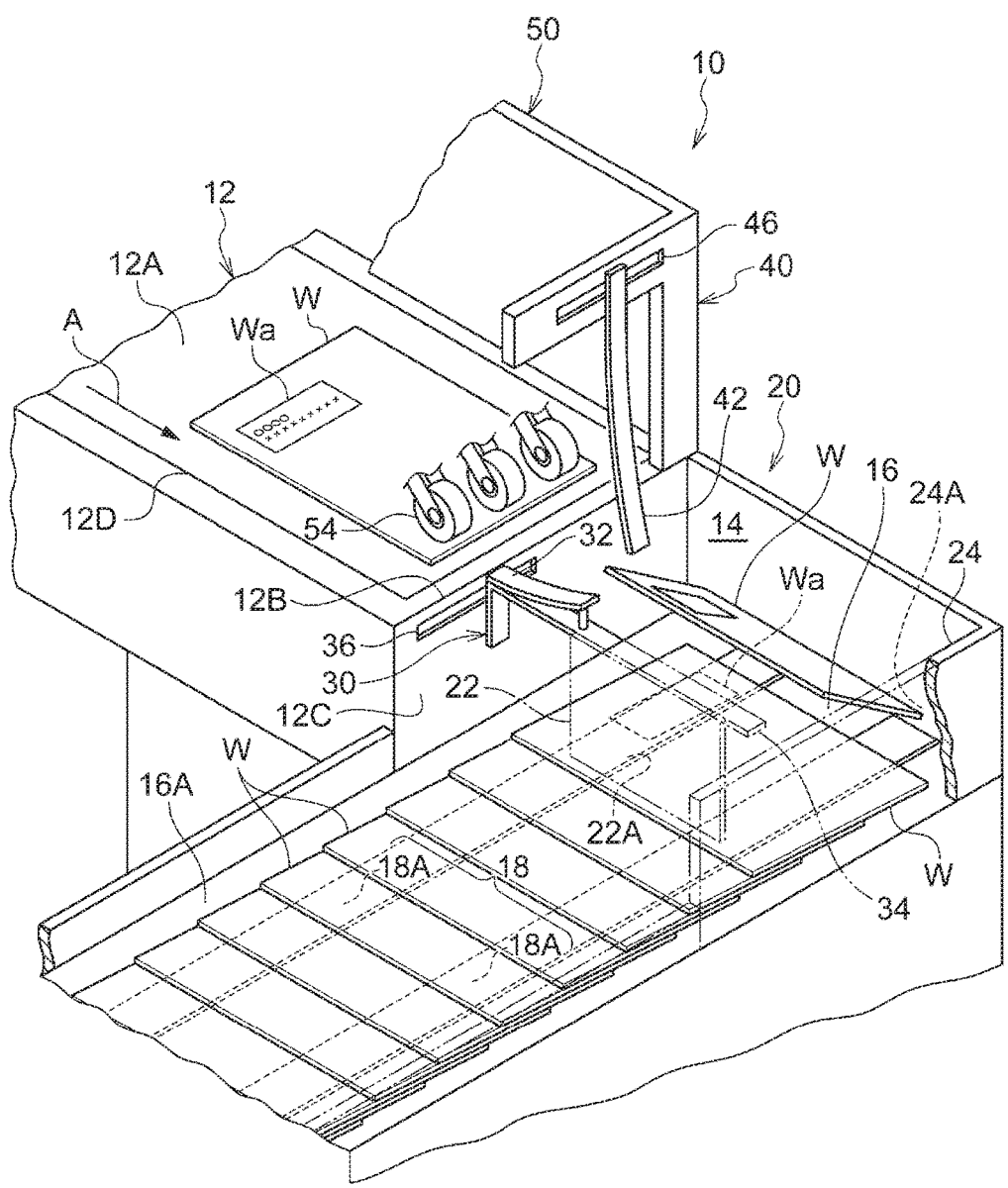
FIG. 4 is a perspective view illustrating the manner in which a transport object is transported by the orientation changing apparatus according to the exemplary embodiment.

As illustrated in FIGS. 1 and 4, an orientation changing apparatus 10 according to the present exemplary embodiment includes a transport path 12 along which the envelope W is transported, a space 14 provided along a portion of the transport path 12, a changing mechanism 20, and a receiving unit 16 that receives the envelope W after the orientation thereof is changed by the changing mechanism 20. The changing mechanism 20 applies a rotational force M to the envelope W in a direction that crosses the transporting direction A while the envelope W is being transported toward the space 14, and thereby changes the orientation of the envelope W. The receiving unit 16 receives the envelope W after the orientation thereof is changed by the changing mechanism 20. The changing mechanism 20 is an example of a changing unit, and the envelope W is an example of a transport object.

Transport Path

As illustrated in FIGS. 1, 4, and 13, the transport path 12 includes an upstream transport path 12A and the space 14, which is formed adjacent to a step portion 12B of the upstream transport path 12A.

The upstream transport path 12A is connected to an address reading unit 66E located upstream of the upstream transport path 12A in an enclosing-and-sealing system 60, which will be described below.

A belt conveyor 12D is provided on the upper surface of the upstream transport path 12A.

Discharge rollers 54, which will be described below, are arranged above the upstream transport path 12A. The discharge rollers 54 oppose and come into contact with the belt conveyor 12D.

Belt Conveyor

As illustrated in FIGS. 1 and 4, the belt conveyor 12D includes a single belt that is wide enough to cover the major portion of the upstream transport path 12A. The belt is endless, and is wrapped around a driving roller and a driven roller (neither is shown).

A support member that supports the belt at the back surface thereof is disposed between the driving roller and the driven roller. The front surface of this belt serves as a transporting surface of the upstream transport path 12A.

Space

As illustrated in FIGS. 1 and 4, the space 14 is formed adjacent to the step portion 12B of the upstream transport path 12A, and has a height large enough to allow the envelope W to be reversed by being rotated 180 degrees with respect to the transporting direction A.

Receiving Unit

As illustrated in FIGS. 1 and 4, the receiving unit 16 is provided at the bottom of the space 14, and serves as a portion of a transporting unit that transports the envelope W to a downstream transport path 16A. Thus, the transport path 12 includes upstream and downstream portions in the transporting direction of the envelope W, the upstream and downstream portions being connected to each other with the space 14 interposed therebetween. In the present exemplary embodiment, the transport path 12 is bent in an L-shape at the space 14 in plan view.

Belt Conveyor

A belt conveyor 18 extends along the receiving unit 16 and the downstream transport path 16A. The belt conveyor 18 is an example of a transporting unit.

The belt conveyor 18 includes two belts 18A arranged with a gap therebetween in the width direction of the downstream transport path. Each belt 18A is endless, and is wrapped around a driving roller and a driven roller (neither is shown).

Each belt 18A has a support member that supports the belt 18A at the back surface thereof. The support member is disposed between the driving roller and the driven roller. The front surfaces of the two belts 18A form the receiving unit 16 and a transporting surface of the downstream transport path 16A.

Envelope

As illustrated in FIG. 4, the envelope W is flat or substantially flat and has a small thickness in the vertical direction. In the present exemplary embodiment, an enclosure is placed in the envelope W, and an address label Wa is attached to the front surface of the envelope W. The envelope W is an example of a transport object.

In the present exemplary embodiment, the envelope W is a mail piece obtained by enclosing and sealing 5 to 10 folded sheets of A4 paper, which serve as an enclosure, in an N3 envelope, which is made of paper having the basis weight of 70 kg.

The envelope W may instead be, for example, a mail piece obtained by enclosing and sealing 2 to 12 folded sheets of A4 paper and an N6 envelope for reply in an N3 envelope as an enclosure.

Changing Mechanism

As illustrated in FIGS. 1 to 4, the changing mechanism 20 includes a first changing section 30, a second changing section 40, and a change assisting unit 50.

The changing mechanism 20 is an example of a changing unit.

First Changing Section

Figure 2:
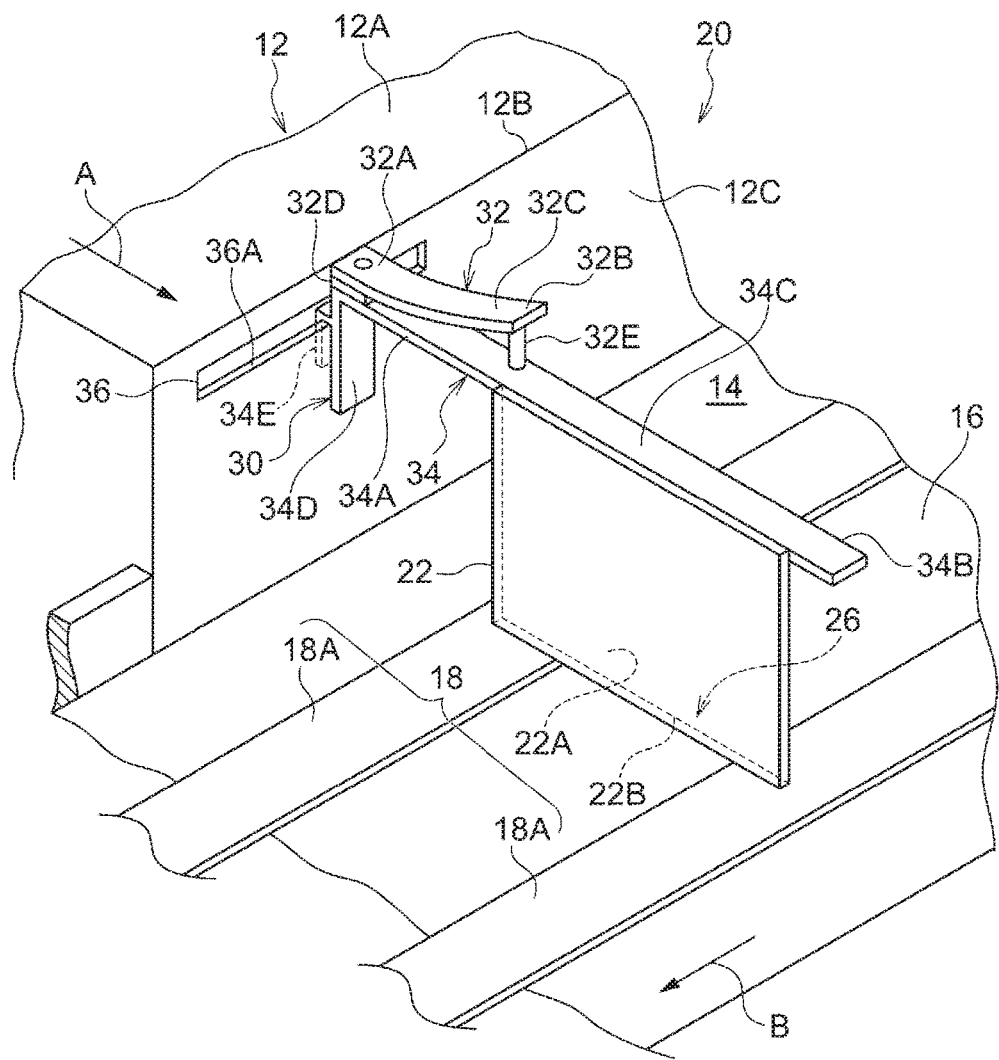
FIG. 2 is a perspective view illustrating the structure of a first unit (first plate-shaped body) included in the orientation changing apparatus according to the present exemplary embodiment.

As illustrated in FIG. 2, the first changing section 30 includes a first fin 32, a first support member 34, and a first support 36.

First Support

The first support 36 is provided on a step surface 12C that extends downward from the step portion 12B of the upstream transport path 12A.

In the present exemplary embodiment, the first support 36 includes an engagement slit 36A formed in the step surface 12C so as to extend parallel to the step portion 12B.

First Support Member

The first support member 34 is provided on the step surface 12C and extends from the step surface 12C into the space 14 in the transporting direction A. The first support member 34 supports the first fin 32, which will be described below.

The first support member 34 extends in the transporting direction A, and includes a proximal portion 34A, a distal portion 34B, and an upper surface 34C that faces upward between the proximal portion 34A and the distal portion 34B.

The proximal portion 34A includes a securing portion 34D that extends downward in a direction that crosses the transporting direction A, and an engagement portion 34E that projects from a surface of the securing portion 34D that faces the step surface 12C. The engagement portion 34E engages with the first support 36.

The engagement portion 34E of the first support member 34 is engaged with the first support 36, which is provided on the step surface 12C that extends from the step portion 12B toward the receiving unit 16. Thus, the first support member 34 is supported and secured.

First Fin

As illustrated in FIG. 2, the first fin 32 is provided on the upper surface 34C of the first support member 34. The first fin 32 is plate-shaped, and includes a proximal portion 32A, a distal portion 32B, and a guide portion 32C that faces upward between the proximal portion 32A and the distal portion 32B.

The first fin 32 extends into the space 14 in such a manner that the guide portion 32C is inclined upward with respect to the transporting direction A.

A part of the guide portion 32C near the proximal portion 32A includes a flat surface that faces in the same direction as the transporting surface of the upstream transport path 12A, and is connected to the upstream transport path 12A.

The guide portion 32C is at the same height as or lower than the transporting surface of the upstream transport path 12A at the step portion 12B.

The first fin 32 is an example of a first unit or a first plate-shaped body.

The proximal portion 32A is attached to the upper surface 34C of the proximal portion 34A of the first support member 34 with a back plate 32D interposed therebetween by, for example, a known attachment technology or a known welding technology.

In the present exemplary embodiment, the first support 36 includes the engagement slit 36A that extends in the width direction of the transport path 12. The engagement portion 34E engages with the engagement slit 36A so that the first fin 32 is movable in the width direction of the transport path 12.

The first support member 34 may be moved and fixed in the width direction of the transport path 12 by using a known moving mechanism and a known fixing unit.

In the present exemplary embodiment, the first fin 32 is a PET plate having a width of 25 mm, a length of 100 mm, and a thickness of 1.0 mm.

The first fin 32 is shorter than a second fin 42. In other words, the first fin 32 is configured to strongly push (flip) the envelope W upward by a movement smaller than a movement of the second fin 42.

Second Changing Section

Figure 3:
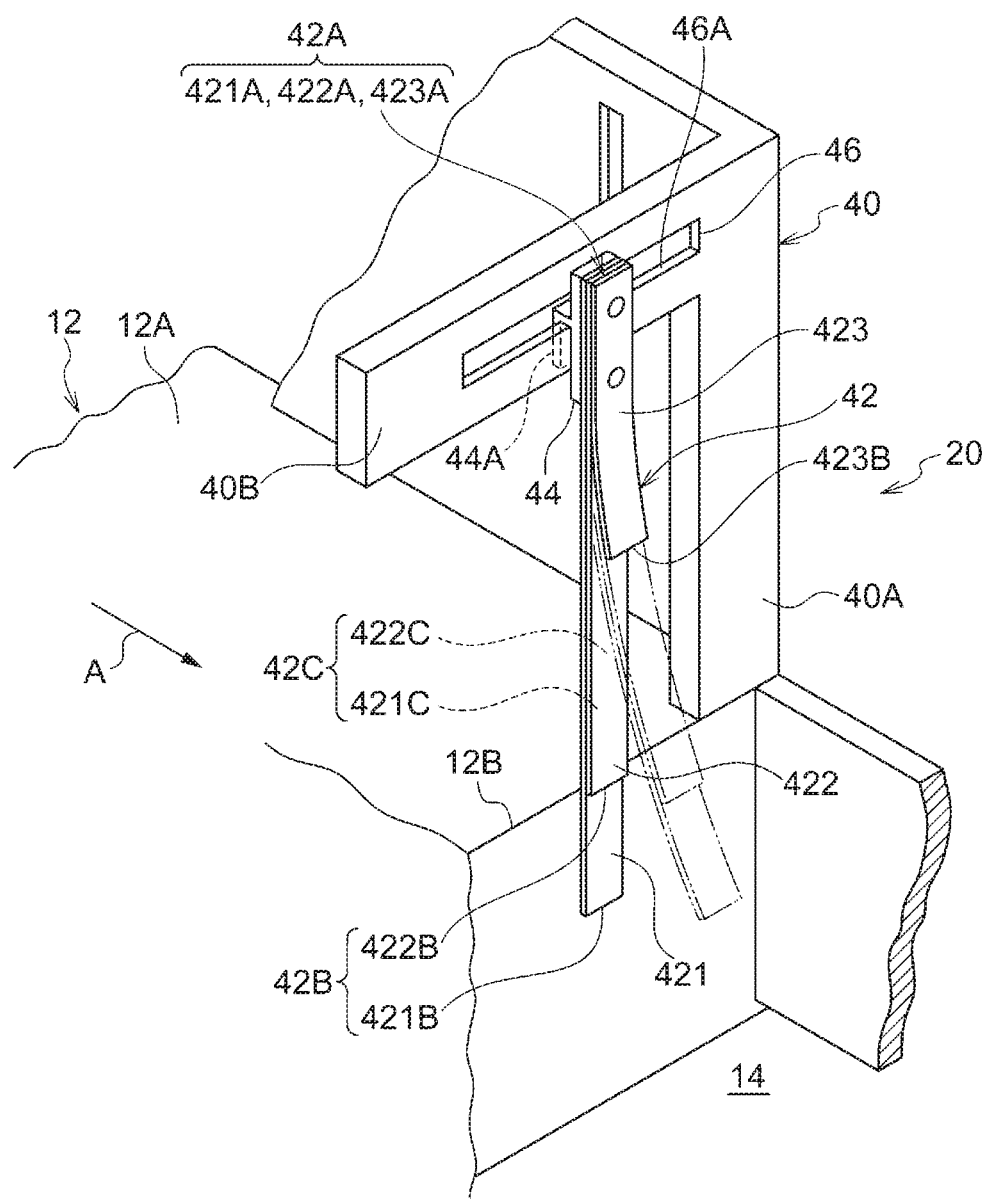
FIG. 3 is a perspective view illustrating the structure of a second unit (second plate-shaped body) included in the orientation changing apparatus according to the present exemplary embodiment.

As illustrated in FIG. 3, the second changing section 40 includes the second fin 42, a second support member 44, and a second support 46.

The second changing section 40 also includes a strut 40A and a support arm 40B.

The strut 40A is provided on the step portion 12B of the upstream transport path 12A so as to extend upward from the right end of the upstream transport path 12A when viewed in a direction opposite to the transporting direction A.

The support arm 40B extends at an angle from an upper portion of the strut 40A in the width direction of the upstream transport path 12A (in the direction in which the step portion 12B extends).

In the present exemplary embodiment, the strut 40A and the support arm 40B form an inverted 'L' shape along the step portion 12B when viewed in the direction opposite to the transporting direction A.

Second Support

As illustrated in FIG. 3, the second support 46 is provided on the downstream surface of the support arm 40B in the transporting direction A. The second support member 44, which will be described below, is supported and secured by the second support 46.

In the present exemplary embodiment, the second support 46 includes an engagement slit 46A formed in the downstream surface of the support arm 40B in the transporting direction A so as to extend in the direction in which the step portion 12B extends.

Second Support Member

As illustrated in FIG. 3, the second support member 44 includes a downstream surface in the transporting direction A, on which the second fin 42, which will be described below, is supported and secured; and an inverted-L-shaped engagement portion 44A that projects from a surface opposite the downstream surface so as extend downward.

The engagement portion 44A engages with the engagement slit 46A of the second support 46 so that the second support member 44 is supported and secured.

Second Fin

As illustrated in FIG. 3, the second fin 42 is plate-shaped, and includes a proximal portion 42A, a distal portion 42B, and a guide portion 42C.

Also, the second fin 42 includes a long fin 421 and a short fin 422 that is shorter than the long fin 421.

The second fin 42 is an example of a second unit or a second plate-shaped body.

The long fin 421 is plate-shaped, and includes a proximal portion 421A, a distal portion 421B, and a guide portion 421C.

The short fin 422 is plate-shaped, and includes a proximal portion 422A, a distal portion 422B, and a guide portion 422C.

The long fin 421 and the short fin 422 are both elastic. Accordingly, the second fin 42 is elastic.

The long fin 421 and the short fin 422 are stacked together so that the guide portion 422C of the short fin 422 is in contact with a surface of the guide portion 421C of the long fin 421 and so that the edges of the proximal portions 421A and 422A are aligned.

The second fin 42 also includes an auxiliary plate 423 that is arranged so that the proximal portion 421A of the long fin 421 and the proximal portion 422A of the short fin 422 are sandwiched between the auxiliary plate 423 and the second support member 44.

The auxiliary plate 423 is curved from top to bottom toward the downstream side in the transporting direction A.

The auxiliary plate 423 is provided to protect a part of the proximal portion 42A that is fixed to the second support member 44 when the second fin 42 is elastically deformed in the transporting direction A by the transporting force of the envelope W, and maintain the elastically deformed shape over the region from the proximal portion 42A to the distal portion 42B.

The auxiliary plate 423 is replaceable depending on, for example, the size of the envelope W.

In the present exemplary embodiment, the long fin 421 and the short fin 422 constitute a single second fin 42.

With regard to the dimensions and material of the long fin 421 and the short fin 422, the long fin 421 is a PET plate having a width of 25 mm, a length of 250 mm, and a thickness of 0.5 mm, and the short fin 422 is a PET plate having a width of 25 mm, a length of 200 mm, and a thickness of 0.5 mm.

The second fin 42 is longer than the first fin 32. In other words, the second fin 42 is configured to softly push the envelope W downward by a movement larger than the movement of the first fin 32.

The long fin 421 and the short fin 422, which constitute the second fin 42, are fixed to the second support member 44.

More specifically, the long fin 421 and the short fin 422 are arranged so that the upstream surface of the proximal portion 421A of the long fin 421 in the transporting direction A is in contact with the downstream surface of the second support member 44 in the transporting direction A. Also, the auxiliary plate 423 is placed on the downstream surface of the proximal portion 422A of the short fin 422, which is stacked on the long fin 421, in the transporting direction A. Thus, the auxiliary plate 423, the short fin 422, and the long fin 421 are stacked together and fixed to the second support member 44 with bolts.

A part of the guide portion 42C of the second fin 42 near the distal portion 42B extends downward from a side surface of the second support member 44 in a direction that crosses the transporting direction A of the envelope W, and extends beyond the step portion 12B into the space 14.

A surface of the second fin 42 that faces in a direction opposite to the transporting direction A (surface that comes into contact with the upper surface of the transport object that is transported) is shifted from the step portion 12B in the transporting direction A.

In the present exemplary embodiment, the second support 46 is formed as the engagement slit 46A, as described above. The engagement portion 44A of the second support member 44 engages with the engagement slit 46A so that the second fin 42 is movable in the width direction of the transport path 12.

The second support member 44 may be moved and fixed in the width direction of the transport path 12 by using a known moving mechanism and a known fixing unit.

Change Assisting Unit

As illustrated in FIG. 1, the change assisting unit 50 includes a wall-shaped member that stands at a side of the upstream transport path 12A and extends in the transporting direction A of the upstream transport path 12A.

The change assisting unit 50 includes a third support 56, a third support member 52, and the discharge rollers 54.

Third Support

As illustrated in FIG. 1, the third support 56 is provided on a surface of the change assisting unit 50 that faces the upstream transport path 12A, and supports the third support member 52, which will be described below.

In the present exemplary embodiment, the third support 56 includes two engagement slits 56A formed in the surface that faces the upstream transport path 12A. The engagement slits 56A are parallel to each other and extend in the vertical direction, which is perpendicular to the transporting surface of the upstream transport path 12A.

Third Support Member

The third support member 52 is a plate-shaped member that is parallel to the transporting surface of the upstream transport path 12A. Two engagement portions (not shown), which engage with the engagement slits 56A of the third support 56, are provided on a surface of the third support member 52 that faces the above-described wall-shaped member.

The engagement portions of the third support member 52 are supported by and fixed to the engagement slits 56A.

In the present exemplary embodiment, the third support member 52 is movable relative to the transporting surface in the vertical direction.

The third support member 52 may be moved and fixed in the vertical direction by using a known moving mechanism and a known fixing unit.

Discharge Rollers

As illustrated in FIG. 1, the discharge rollers 54 are provided on the lower surface of the third support member 52 that faces the transporting surface of the upstream transport path 12A.

The discharge rollers 54 are provided on the third support member 52 so as to be located upstream of the step portion 12B of the upstream transport path 12A in the transporting direction A, and are in contact with the surface of the belt of the belt conveyor 12D provided on the upstream transport path 12A.

The discharge rollers 54 are an example of a third unit or a movement restricting unit.

The discharge rollers 54 restrict a vertical movement of a trailing end portion of the envelope W in the transporting direction A while a leading end portion and an intermediate portion of the envelope W in the transporting direction A receive rotational forces M1 and M2 (see FIGS. 7 and 8) from the first fin 32 and the second fin 42.

In the present exemplary embodiment, three discharge rollers 54 are arranged with gaps therebetween in a direction perpendicular to the transporting direction A of the upstream transport path 12A (in the width direction of the upstream transport path 12A).

The discharge rollers 54 are elastically suspended from the lower surface of the third support member 52, and are vertically movable relative to the surface of the belt of the belt conveyor 12D.

Straightening Plate and Correcting Unit

Straightening Plate

As illustrated in FIG. 2, the straightening plate 22 is a plate-shaped member that limits rotation of the envelope W received by the receiving unit 16. The straightening plate 22 includes an inner surface 22A. A side of the envelope W that moves upward when the envelope W is rotated comes into contact with the inner surface 22A (see FIG. 12). The straightening plate 22 is an example of a limiting unit.

The straightening plate 22 is supported on a surface of the first support member 34 that faces in the transporting direction B. The straightening plate 22 extends along the first support member 34 in the transporting direction A, and hangs downward toward the receiving unit 16.

The length of the straightening plate 22 in the transporting direction A is set so that the straightening plate 22 covers a predetermined region of the receiving unit 16 in the depth direction (width direction of the downstream transport path 16A in the transporting direction B).

In the present exemplary embodiment, the length of the straightening plate 22 in the transporting direction A is smaller than the allowable length of the envelope W (transport object) in the transporting direction A according to the orientation changing apparatus 10.

The straightening plate 22 is supported by the first support member 34 so as to be swingable in the transporting direction B.

Correcting Unit

Referring to FIG. 2, a correcting unit 26 is constituted by a bottom end portion of the inner surface 22A and a lower surface 22B of the straightening plate 22.

A gap is formed between the lower surface 22B and the surface of each belt 18A of the belt conveyor 18. The gap is set so as to allow two overlapping envelopes W to pass therethrough.

Stopper Plate

As illustrated in FIG. 1, the stopper plate 24 is a plate-shaped member that limits a movement of the envelope W in the transporting direction A. The stopper plate 24 includes an inner surface 24A. A leading edge of the envelope W in the transporting direction A comes into contact with the inner surface 24A. The stopper plate 24 is an example of a stopper unit.

The stopper plate 24 stands at a downstream side of the receiving unit 16 in the transporting direction A.

Enclosing-and-Sealing System

As illustrated in FIG. 13, the enclosing-and-sealing system 60 includes an envelope transport unit 60A; an enclosure transport unit 60B; an inserting unit 60C that inserts an enclosure (not shown) into the envelope W; a sealing unit 60D that seals the envelope W in which the enclosure has been inserted; an envelope reversing unit 60E that reverses the envelope W sealed by the sealing unit; an address reading unit 60F that reads the address on the envelope W; and a controller (not shown) that controls the enclosing-and-sealing system 60. The address reading unit 60F is connected to the orientation changing apparatus 10, which reverses the envelope W in the space 14, at the downstream side thereof.

The controller of the enclosing-and-sealing system 60 includes a storage device (not shown), and stores a program for controlling the operation of the enclosing-and-sealing system 60. The storage device stores address data for delivery of the envelope W, which is a mail piece, in association with enclosure data regarding the enclosure (not shown) in the envelope W.

Envelope Transport Unit

The envelope transport unit 60A includes a labeler (not shown) that attaches an address label Wa to the surface of the envelope W while the envelope W is being transported, and is connected to the inserting unit 60C, which will be described below.

Enclosure Transport Unit

The enclosure transport unit 60B transports the enclosure to be inserted in the envelope W. The enclosure transport unit 60B is connected to the inserting unit 60C, which will be described below.

Inserting Unit

The inserting unit 60C is a device for inserting the enclosure transported by the enclosure transport unit 60B into the envelope W transported by the envelope transport unit 60A and having the address label Wa attached thereto.

Sealing Unit

The sealing unit 60D is a device for sealing the opening in the envelope W after the enclosure is inserted therein by the inserting unit 60C.

The sealed envelope W is transported with the address label Wa facing downward.

Envelope Reversing Unit

The envelope reversing unit 60E reverses the envelope W transported with the address label Wa facing downward, and changes the orientation thereof so that the address label Wa faces upward.

Address Reading Unit

The address reading unit 60F includes an imaging unit (not shown) that reads the address printed on the address label Wa.

Operation of Orientation Changing Apparatus

The operation of the orientation changing apparatus 10 will be described with reference to FIGS. 5 to 12.

Figure 5:
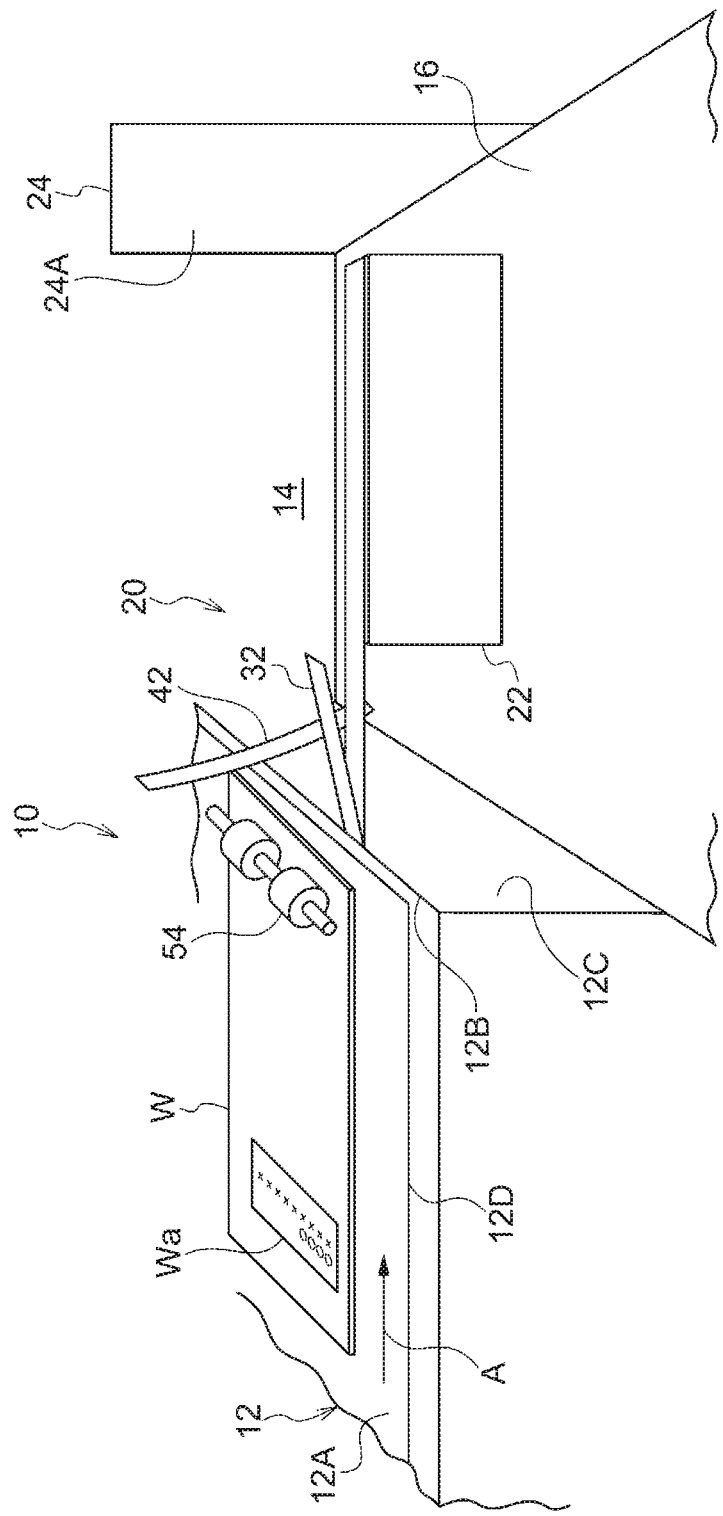
FIG. 5 is a schematic side view of the orientation changing apparatus according to the exemplary embodiment illustrating the state before the orientation is changed.

FIG. 5 is a schematic side view of the orientation changing apparatus 10 according to the present exemplary embodiment viewed in a direction that crosses the transporting direction A of the envelope W (hereinafter referred to as a "side" view), illustrating the state before the orientation of the envelope W is changed.

The envelope W is transported along the upstream transport path 12A by the belt conveyor 12D with the surface having the address label Wa attached (hereinafter referred to as the "front surface") facing upward. The vertical movement of the envelope W is restricted by the discharge rollers 54 at a location upstream of the step portion 12B in the transporting direction A.

The leading end of the envelope W in the transporting direction A has not yet reached the first fin 32 and the second fin 42, and the envelope W is about to be ejected into the space 14 from the step portion 12B with the front surface thereof facing upward.

Figure 6:
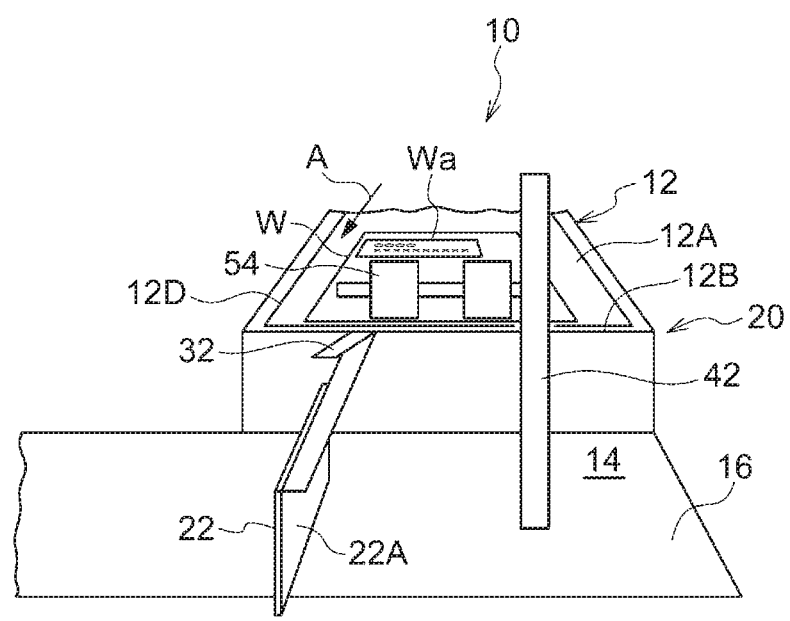
FIG. 6 is a schematic front view of the orientation changing apparatus according to the exemplary embodiment illustrating the state before the orientation is changed.

FIG. 6 is a schematic front view of FIG. 5, viewed in a direction opposite to the transporting direction A of the envelope W (hereinafter referred to as a "front" view).

The envelope W is transported toward the first fin 32 and the second fin 42.

The first fin 32 is disposed so as to come into contact with a portion of the envelope W at the left side, which is one side in the direction that crosses the transporting direction A, in the front view. The second fin 42 is disposed so as to come into contact with a portion of the envelope W at the right side, which is the other side in the direction that crosses the transporting direction A, in the front view.

Figure 7:
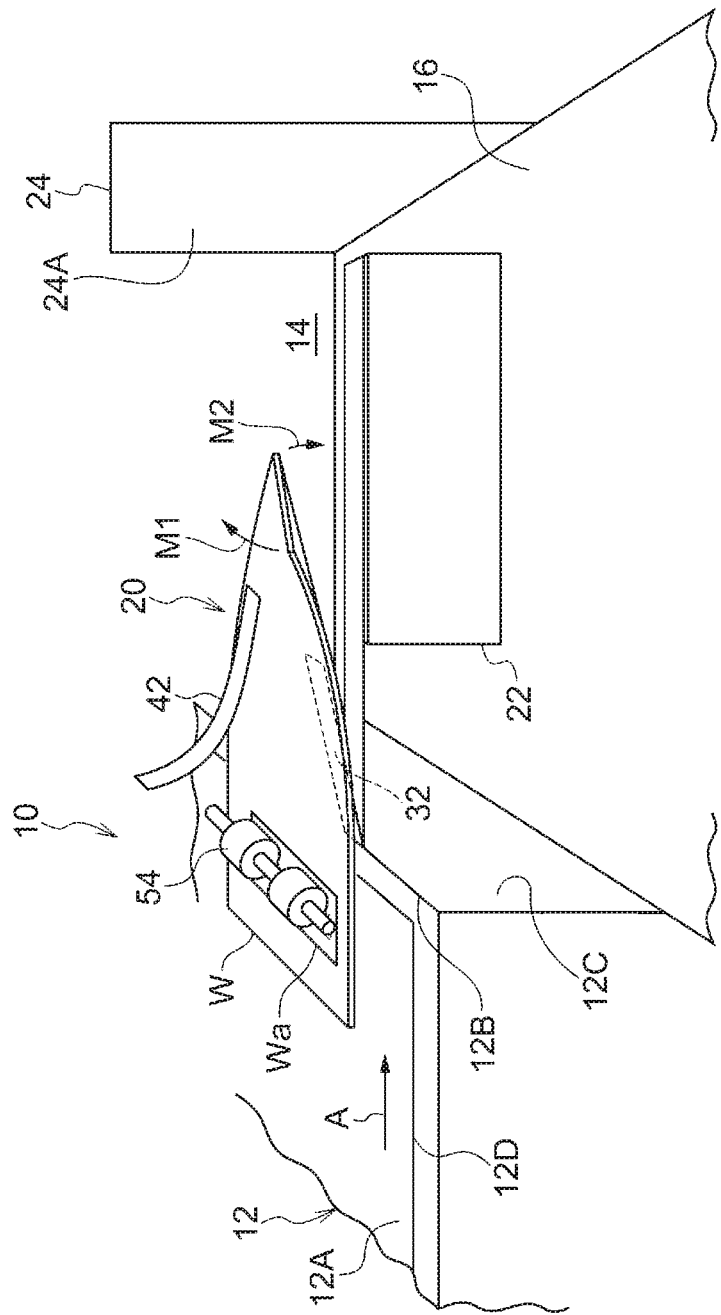
FIG. 7 is a schematic side view of the orientation changing apparatus according to the exemplary embodiment when an orientation changing operation is started.

FIG. 7 is a schematic side view of the orientation changing apparatus 10 according to the present exemplary embodiment when an orientation changing operation for the envelope W is started.

Also in the description of this side view, the near side of the envelope W is referred to as the left side and the far side of the envelope W is referred to as the right side for convenience.

As illustrated in FIG. 7, the envelope W is transported along the upstream transport path 12A so as to be ejected into the space 14 from the step portion 12B while the vertical movement thereof is restricted by the discharge rollers 54 on the belt conveyor 12D.

The envelope W comes into contact with the first fin 32 and the second fin 42.

In FIG. 7, the guide portion 32C of the first fin 32 is in contact with the surface of the envelope W that does not have the address label Wa attached thereto (hereinafter referred to as the "back surface"), and applies an upward rotational force M1 to the envelope W at the left side of the envelope W. Accordingly, the orientation of the envelope W is changed so that the left side of the envelope W is inclined upward with respect to the transporting direction A.

The first fin 32 strongly pushes (flips) the envelope W upward by a movement smaller than a movement of the second fin 42.

The guide portion 42C of the second fin 42 is in contact with the front surface, and applies a downward rotational force M2 to the envelope W at the right side of the envelope W. Accordingly, the orientation of the envelope W is changed so that the right side of the envelope W is inclined downward with respect to the transporting direction A.

The second fin 42 is elastically deformed so as to be curved toward the transporting direction A while the guide portion 42C is in contact with the front surface of the envelope W.

The second fin 42 softly pushes the envelope W downward by a movement larger than the movement of the first fin 32.

Figure 8:
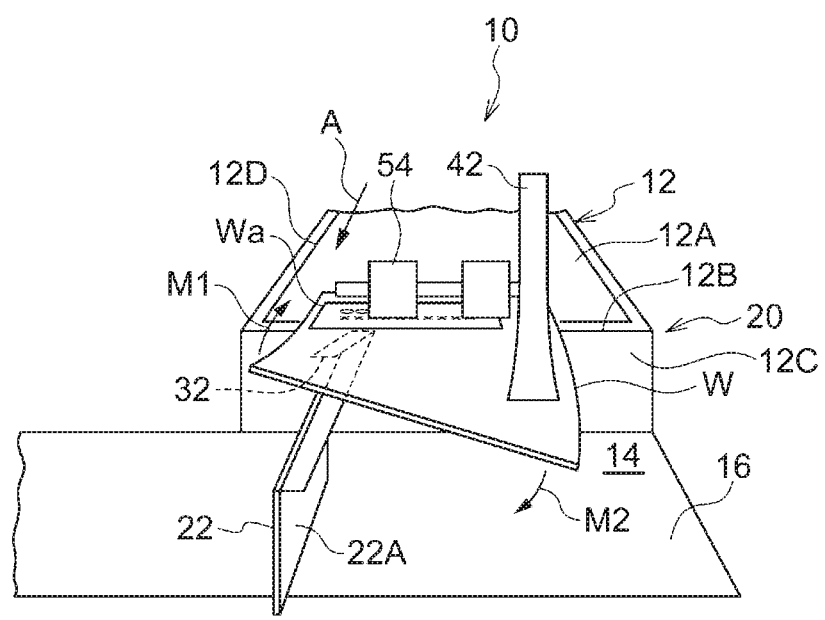
FIG. 8 is a schematic front view of the orientation changing apparatus according to the exemplary embodiment when the orientation changing operation is started.

FIG. 8 is a front view illustrating this state.

As illustrated in FIG. 8, the leading end portion of the envelope W in the transporting direction A receives the upward rotational force M1 from the first fin 32 at the left side of the envelope W, and receives the downward rotational force M2 from the second fin 42 at the right side of the envelope W. Accordingly, a clockwise rotational force M is applied in FIG. 8.

At this time, the trailing end portion of the envelope W in the transporting direction A is on the belt conveyor 12D, and the vertical movement thereof is restricted by the discharge rollers 54.

Thus, the leading end portion of the envelope W receives the rotational forces M1 and M2 in the clockwise direction, and the trailing end portion of the envelope W receives a rotational force in a counterclockwise direction with respect to to the leading end portion.

In FIGS. 7 and 8, the amount by which the envelope W is twisted is exaggerated to facilitate understanding of the above-described state.

Figure 9:
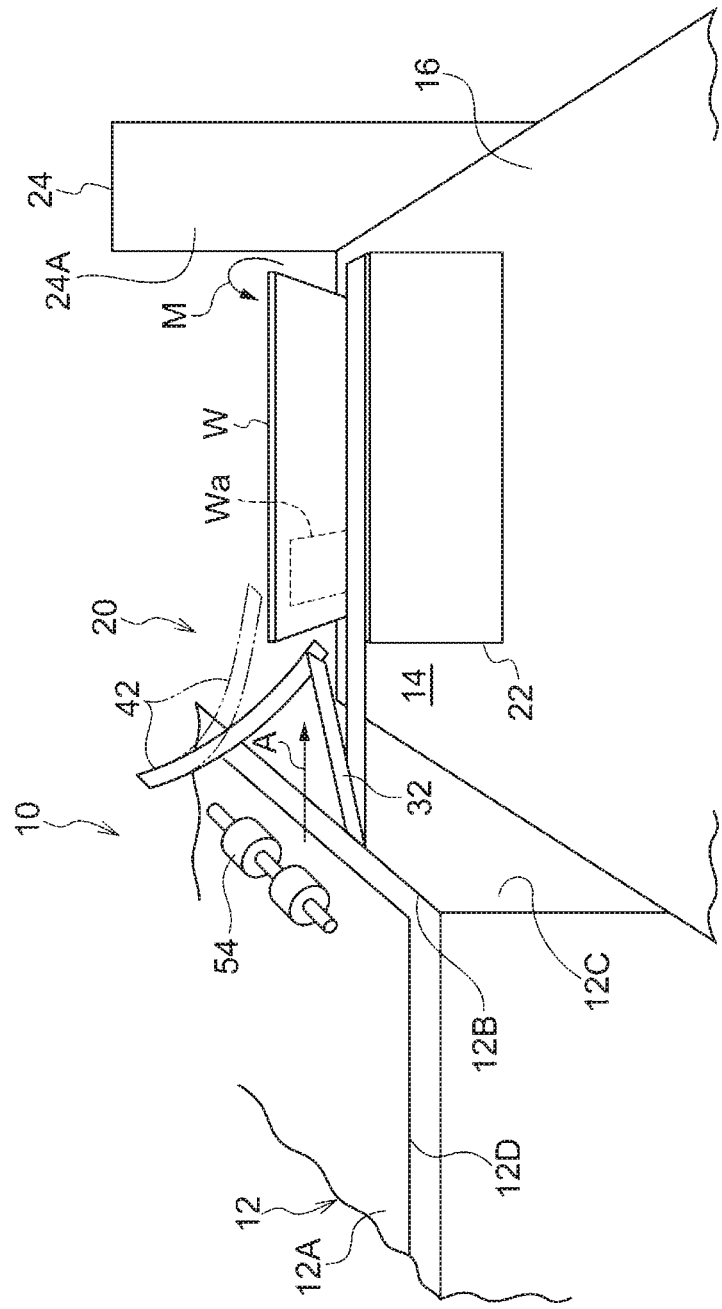
FIG. 9 is a schematic side view of the orientation changing apparatus according to the exemplary embodiment illustrating an aerial movement in the orientation changing operation.

FIG. 9 illustrates the next movement.

As illustrated in FIG. 9, the trailing end portion of the envelope W in the transporting direction A is released from the discharge rollers 54, which have been restricting the vertical movement of the trailing end portion on the upstream transport path 12A. The trailing end portion passes the step portion 12B and enters the space 14.

The back surface of the envelope W becomes separated from the guide portion 32C of the first fin 32 at the left side while the envelope W rotates. Accordingly, the upward rotational force M1 applied to the envelope W by the first fin 32 at the left side of the envelope W is eliminated.

The front surface of the envelope W also becomes separated from the guide portion 42C of the second fin 42 at the right side while the envelope W rotates. Accordingly, the downward rotational force M2 applied to the envelope W by the second fin 42 at the right side of the envelope W is also eliminated.

The first fin 32, which exerts an elastic force larger than that of the second fin 42, flips the envelope W upward by a movement smaller than the movement of the second fin 42.

When the envelope W is released from the discharge rollers 54 that have been restricting the vertical movement of the trailing end portion of the envelope W, the trailing end portion of the envelope W receives a clockwise rotational force M based on the restoring force of the envelope W that has been twisted. Accordingly, the rotational speed increases while the envelope W continuously moves in the space 14 in the transporting direction A.

At this time, the second fin 42 that has been elastically deformed is returned from the position shown by the virtual lines to the position shown by the solid lines in FIG. 9, and then to the initial position (position shown by the solid lines in FIG. 3) at the step portion 12B. Accordingly, the trailing end portion of the envelope W that rotates at the increased rotational speed does not come into contact with the second fin 42.

Figure 10:
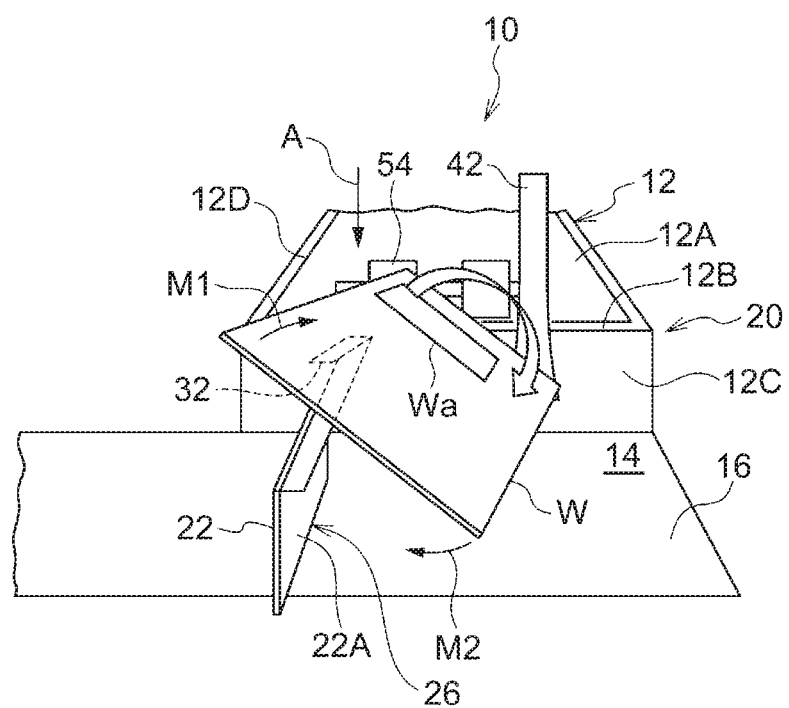
FIG. 10 is a schematic front view of the orientation changing apparatus according to the exemplary embodiment illustrating the aerial movement in the orientation changing operation.

FIG. 10 is a front view illustrating this state.

The envelope W is separated from the first fin 32 and the second fin 42, and is transported while being rotated in the space 14 due to the transporting force in the transporting direction A and the rotational forces M1 and M2.

At this time, the envelope W is further transported in the space 14 while being rotated toward the inner surface 22A of the straightening plate 22 without coming into contact with the receiving unit 16.

Figure 11:
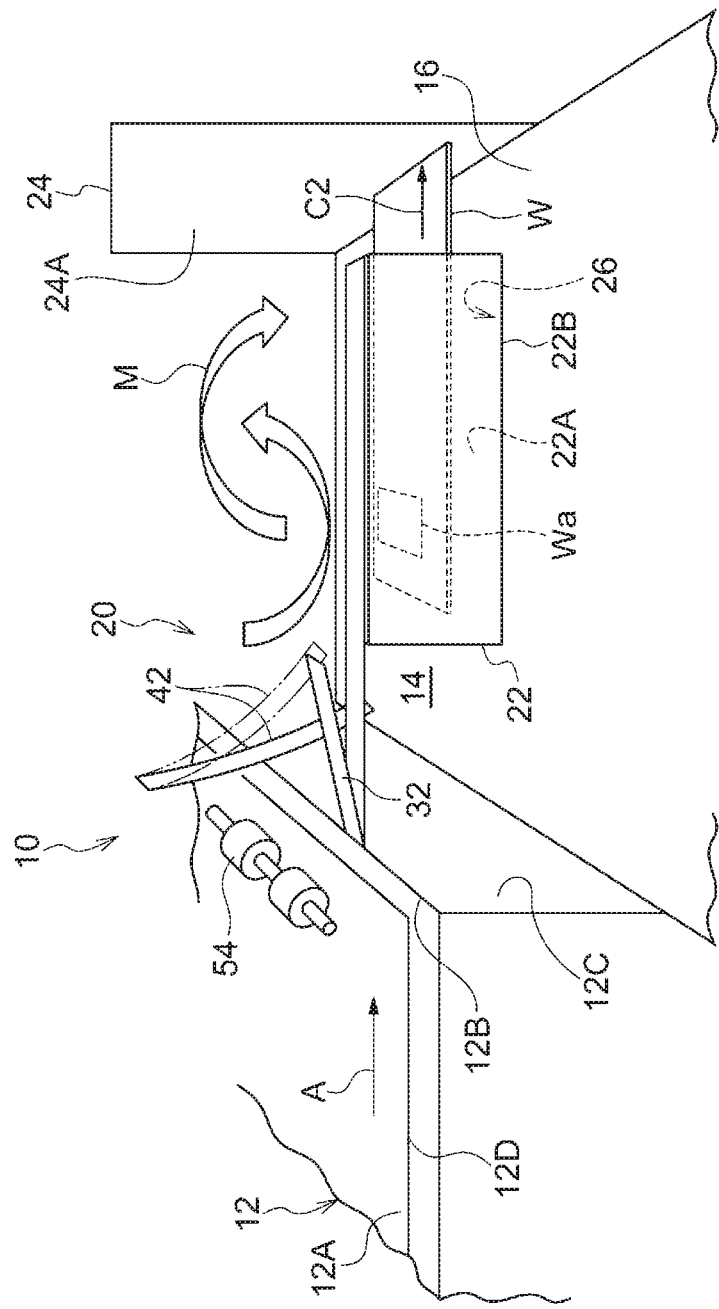
FIG. 11 is a schematic side view of the orientation changing apparatus according to the exemplary embodiment illustrating the state immediately before the end of the orientation changing operation.
Figure 12:
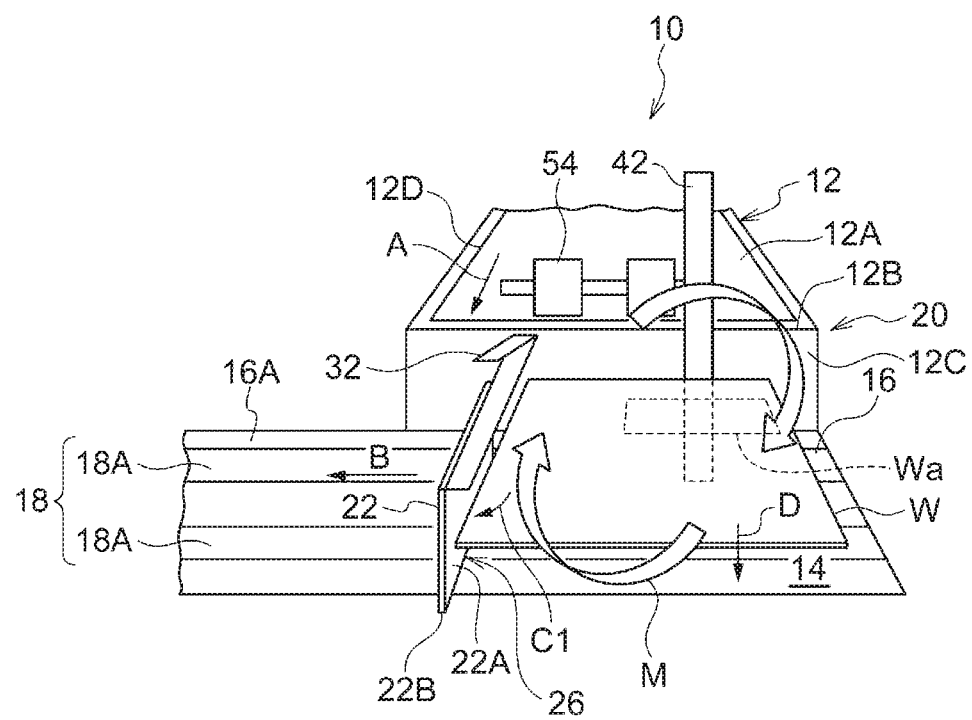
FIG. 12 is a schematic front view of the orientation changing apparatus according to the exemplary embodiment illustrating the state immediately before the end of the orientation changing operation.

Then, as illustrated in FIGS. 11 and 12, the rotational force applied to the envelope W is eliminated and the envelope W stops to rotate when the right side of the envelope W before the change in orientation, that is, before the start of rotation, comes into contact with the inner surface 22A of the straightening plate 22, as shown by arrow C1 in FIG. 12.

In addition, the transporting force applied to the envelope W in the transporting direction A is also eliminated when the leading end portion of the envelope W in the transporting direction A comes into contact with the inner surface 24A of the stopper plate 24, as shown by arrow C2 in FIG. 11.

The envelope W, whose orientation has been changed by 180 degrees, is received by the belt conveyor 18 of the receiving unit 16 and transported along the downstream transport path 16A in the direction of arrow B shown in FIG. 12.

The operation of transporting and rotating the envelope W described above with reference to FIGS. 5 to 12 is successively performed for the following envelopes W.

Referring to FIG. 4, the transport speed of the transport path 12 is controlled so that the succeeding envelope W partially overlaps the preceding envelope W on the receiving unit 16 after the orientation thereof is changed by the above-described operation.

More specifically, the envelopes W partially overlap so that a downstream portion of the front surface of the succeeding envelope W in the transporting direction B of the downstream transport path 16A is placed on an upstream portion of the back surface of the preceding envelope W in the transporting direction B of the downstream transport path 16A.

At this time, the downstream sides of the envelopes W are aligned with respect to the transporting direction B by the correcting unit 26.

More specifically, the downstream portion of the succeeding envelope W is placed on the preceding envelope W, and the downstream side of the succeeding envelope W is aligned along the inner surface 22A of the straightening plate 22 included in the correcting unit 26 and stops by coming into contact with the bottom end portion of the inner surface 22A.

At this time, the preceding envelope W is transported in the transporting direction B by the belt conveyor 18 under the succeeding envelope W that is aligned and stopped.

The succeeding envelope W, which is in contact with and stopped by the correcting unit 26, slides along the preceding envelope W (along the back surface of the envelope W whose orientation has been changed) until the amount of overlap becomes small enough to allow the succeeding envelope W to pass under the lower surface 22B. Thus, the amount of overlap between the preceding envelope W and the succeeding envelope W is adjusted.

The amount of overlap between the preceding envelope W and the succeeding envelope W is adjusted when the downstream side of the succeeding envelope W passes through the gap formed between the lower surface 22B of the bottom end portion of the straightening plate 22 and the surface of each belt 18A of the belt conveyor 18 in the correcting unit 26.

When, for example, the succeeding envelope W overlaps the preceding envelope W at an angle relative to the correcting unit 26 in plan view, first, the leading corner of the succeeding envelope W in the transporting direction B comes into contact with the inner surface 22A of the straightening plate 22, which constitutes the correcting unit 26.

Also in this case, the preceding envelope W is transported in the transporting direction B under the succeeding envelope W, which is at an angle.

Accordingly, even when the succeeding envelope W is at an angle relative to the correcting unit 26 in plan view, the succeeding envelope W is gradually straightened by the correcting unit 26, and the amount of overlap between the preceding envelope W and the succeeding envelope W is reduced to an amount small enough to allow the succeeding envelope W to pass under the lower surface 22B. Thus, the amount of overlap is adjusted.

In the present exemplary embodiment, the gap between the lower surface 22B of the straightening plate 22 (correcting unit 26) and the surface of each belt 18A of the belt conveyor 18 of the receiving unit is set to about twice to three times the thickness of the envelopes W.

When this gap is small, the amount of overlap between the preceding envelope W and the succeeding envelope W is also small. When the gap is large, the amount of overlap is also large.

The amount of overlap may also be adjusted by changing the transport speed of the belt conveyor 18.

The upstream transport path 12A is connected to the enclosing-and-sealing system 60, which performs upstream processes. The processes performed by the enclosing-and-sealing system 60 will now be described.

The envelope transport unit 60A successively transports the envelopes W in such an orientation that the back surfaces thereof face upward.

While each envelope W is being transported, the labeler (not shown) included in the envelope transport unit 60A prints an address, including a zip code, stored in the storage device of the controller on the address label Wa, and attaches the address label Wa to the front surface of the envelope W.

The envelope W having the address label Wa attached thereto is transported to the inserting unit 60C in such an orientation that the back surface thereof faces upward.

The enclosure transport unit 60B transports an enclosure (not shown) to be inserted into the envelope W to the inserting unit 60C. A certain number of sheets are prepared in advance as the enclosure on the basis of enclosure data stored in the storage device of the controller in association with the address.

The inserting unit 60C inserts the enclosure, which is prepared in advance and transported by the enclosure transport unit 60B, into the opening of the envelope W, which has the address label Wa attached thereto and which is transported by the envelope transport unit 60A in such an orientation that the back surface thereof faces upward.

The sealing unit 60D seals the envelope W, in which the enclosure has been inserted, by folding a flap provided at the opening of the envelope W so as to cover the opening with a sealing member (not shown). The sealed envelope W is transported toward the envelope reversing unit 60E in such an orientation that the back surface thereof faces upward.

The envelope reversing unit 60E reverses the envelope W, which has been transported in such an orientation that the back surface thereof faces upward, by 180 degrees by using a pair of twisting belts (not shown), so that the address label Wa faces upward. Then, the envelope reversing unit 60E transports the envelope W toward the address reading unit 60F located downstream thereof.

The address reading unit 60F reads the address, including the zip code, printed on the address label Wa with an imaging unit (not shown).

The address read by the imaging unit is checked by using the address data for delivery of the mail piece stored in advance in the storage device of the controller and the enclosure data associated with the address data. Then, the envelope W is transported to the orientation changing apparatus 10, which performs the next process.

The orientation changing apparatus 10 changes the orientation of the envelope W by 180 degrees so that the address label Wa faces downward.

The orientation changing operation for the envelopes W is described above.

In the present exemplary embodiment, the first fin 32, the second fin 42, and the discharge rollers are movable so that the orientation changing operation may be performed on transport objects of different sizes.

FIG. 14 illustrates a transport device 100 according to a comparative example including a first belt 110 and a second belt 120, which are in contact with each other along a transporting direction X of an envelope (not shown) and twisted 180 degrees. The transport device 100 does not include the changing mechanism 20 that changes the orientation of the envelope W by 180 degrees in the space 14.

The first belt 110 is an endless belt, and is wrapped around an upstream support roller 112 and a downstream support roller 114 so as to be twisted 180 degrees.

The second belt 120 is an endless belt, and is wrapped around an upstream support roller 122 and a downstream support roller 124 so as to be twisted 180 degrees along the first belt.

A nip section 130, in which surfaces of the first belt 110 and the second belt 120 come into contact with each other, and a feeding portion 150, which includes a feeding belt, are disposed in an upstream section of the first belt 110 and the second belt 120.

Similarly, a release section 132, in which the surfaces of the first belt and the second belt become separated from each other, and a discharge portion 160, which includes a discharge belt, are disposed in a downstream section of the first belt 110 and the second belt 120.

In the transport device 100 according to the related art having the above-described structure, an envelope is fed to the upper surface of the first belt 110 by the feeding portion 150, and is nipped by the first belt 110 and the second belt 120 in the nip section 130.

The envelope in the nipped state is twisted while being transported to the downstream support roller 114 that supports the first belt, and is thereby reversed. The reversed envelope is released from the nip in the release section 132, and is discharged from the discharge portion 160.

To prevent the envelope from being wrinkled or bent by being twisted, the transport device has a length longer than that of the envelope to be transported in the transporting direction.

The envelope cannot be placed on top of another envelope in the release section 132, and the envelope transported out of the release section 132 cannot be discharged from the discharge portion 160 in such a manner that the envelope is placed on top of another envelope.

In contrast to the comparative example, according to the present exemplary embodiment, the changing mechanism 20 is used to change the orientation of the envelope W by applying a rotational force in a direction that crosses the transporting direction in the space 14.

Accordingly, the orientation of the transport object may be changed by using a device that is smaller in the transporting direction than the device including plural belts having a twisted structure.

The changing mechanism 20 includes the first fin 32, which applies the upward rotational force M1 to the envelope W at one side in a direction that crosses the transporting direction, and the second fin 42, which applies the downward rotational force M2 to the envelope W at the other side in the direction that crosses the transporting direction.

Accordingly, the orientation of the envelope W may be changed by a device that is smaller in the transporting direction A than a device that applies a rotational force to the envelope W only at one side in the direction that crosses the transporting direction.

In addition, the upstream transport path 12A has the discharge rollers 54 that restrict the vertical movement of the trailing end portion of the envelope W in the transporting direction A when the first fin 32 and the second fin 42 are respectively applying the rotational forces M1 and M2 to the envelope W.

Accordingly, the orientation of the envelope W may be changed by using a device that is smaller in the transporting direction A than a device that applies the rotational force while the movement of the envelope W is not restricted on the upstream transport path 12A.

The guide portion 32C of the first fin 32 extends into the space 14 so as to be inclined upward with respect to the extension of the transporting surface of the upstream transport path 12A in the transporting direction A.

The guide portion 42C of the second fin 42 extends into the space 14 in a direction that crosses the extension.

Accordingly, the orientation of the envelope W may be changed by using a device smaller in the transporting direction A than a device in which the first fin 32 and the second fin 42 extend in the same direction.

The first fin 32 and the second fin 42 are both elastic. Therefore, when the orientation of the envelope W received by the receiving unit 16 is reversed by 180 degrees, the envelope W does not interfere with the second fin 42 while the orientation thereof is being changed.

Accordingly, the risk of failure in the operation of changing the orientation of the transport object is lower than that in the case where the envelope W is reversed by 180 degrees by using fins that are not elastic.

The first fin 32 has a length shorter than that of the second fin 42.

Accordingly, the rotational force M may be more effectively applied to the envelope W than when the length of the first fin 32 is greater than or equal to that of the second fin 42.

The changing mechanism 20 includes the straightening plate 22 that limits the rotation of the envelope W received by the receiving unit 16.

Accordingly, the risk of failure in the operation of changing the orientation of the envelope W is lower than that in the case where a changing unit that does not include the straightening plate 22 is used.

The changing mechanism 20 includes the stopper plate 24 that limits the movement of the envelope W in the transporting direction A.

Accordingly, the orientation of the transport object may be changed by using a device that is smaller in the transporting direction than a device including a changing unit that does not include the stopper plate 24.

The receiving unit 16 is a portion of the belt conveyor 18 that transports the envelope W downstream in the transporting direction B.

Accordingly, the envelope W whose orientation has been changed may be continuously transported and subjected to the next process after the orientation changing operation.

The transport speed at which the envelope W is transported from the upstream transport path 12A to the changing mechanism 20 is controlled so that the succeeding envelope W partially overlaps the preceding envelope W when the succeeding envelope W is received by the receiving unit 16 after the orientation thereof is changed in midair by the changing mechanism 20.

Accordingly, unlike the case where the transport speed is such that the succeeding envelope W does not overlap the preceding envelope W, the envelopes W whose orientations have been changed may be collected in such a manner that they are stacked in the order in which they are transported.

The changing mechanism 20 includes the correcting unit 26 that corrects the overlapping state of the envelopes W received by the receiving unit 16.

Accordingly, the envelopes W whose orientations have been changed may be more easily collected than when a changing mechanism including a receiving unit 16 that does not include the correcting unit 26 is used.

The enclosing-and-sealing system 60 according to the present exemplary embodiment includes the orientation changing apparatus 10.

Accordingly, the orientation of the envelope W may be changed by using a device smaller in the transporting direction than a device included in an enclosing-and-sealing system that does not use the orientation changing apparatus 10 to change the orientation of the envelope W.

Although a specific exemplary embodiment of the present invention has been described in detail, the present invention is not limited to the exemplary embodiment. It is obvious to a person skilled in the art that various other exemplary embodiments are possible within the scope of the present invention.

For example, in the present exemplary embodiment, the upward rotational force M1 is applied to the envelope W at one side in a direction that crosses the transporting direction A, and the downward rotational force M2 is applied to the envelope W at the other side in the direction that crosses the transporting direction A. However, the rotational force may be applied only at one or the other side.

In addition, although the rotational force M1 or M2 at one or the other side is generated by using the first fin 32 or the second fin 42, which come into contact with the envelope W, a fluid-ejection changing mechanism 20 may instead be used.

For example, the orientation of the envelope W may be changed by ejecting fluid that applies the rotational force M1 or M2 to the envelope W at one or the other side.

Although the angle by which the orientation of the envelope W is changed is set to 180 degrees, the angle is not limited to this, and may instead be set to another desired angle, such as 90 degrees.

Although the upper surface of the proximal portion 32A of the first fin 32 is at the same height as or lower than the transporting surface of the upstream transport path 12A, the proximal portion 32A may instead be placed on and fixed to the transporting surface of the upstream transport path 12A.

Although the long fin 421 and the short fin 422 of the second fin 42 are each formed of a single fin, each of the long fin 421 and the short fin 422 may instead be formed of plural fins.

Although the long fin 421 and the short fin 422 of the second fin 42 have different lengths, they may instead have the same length.

Although the second fin 42 is formed by stacking the long fin 421 and the short fin 422 together, the second fin 42 may instead be formed of a single fin.

Although the first fin 32 and the second fin 42 are formed of PET plates, they may instead be formed of elastic resin plates made of a material other than PET. Alternatively, steel plates or spring steel plates may be used.

Although the first fin 32 and the second fin 42 are both supported and secured in a movable manner, one or both of them may instead be fixed.

The second fin 42 may be configured to swing in the transporting direction A relative to the support arm 40B of the second changing section 40.

The first fin 32 and the second fin 42 are arranged so that the first fin 32 is at the left side and the second fin 42 is at the right side in front view viewed in a direction opposite to the transporting direction A. However, the first fin 32 and the second fin 42 may instead be arranged at the opposite sides in the left-right direction to change the rotation direction of the envelope W.

In this case, similar to the first fin 32 and the second fin 42, the straightening plate 22 and the correcting unit 26 may also be arranged at the opposite side in the left-right direction. Accordingly, the transporting direction B in which the downstream transport path 16A extends in the present exemplary embodiment is changed by 180 degrees in plan view.

It is described above that the envelope W receives the rotational force of the second fin 42 at the right side thereof. However, the location at which the rotational force of the second fin 42 is applied is not limited to this, and may instead be set to the center of the envelope W or any appropriate location between the center and the right side of the envelope W in accordance with the size, weight, etc., of the transport object.

Furthermore, it is described above that the envelope W simultaneously comes into contact with the first fin 32 and the second fin 42. However, the time at which the envelope W comes into contact with the first fin 32 may differ from the time at which the envelope W comes into contact with the second fin 42.

Although the address label Wa is attached to the envelope W, the envelope W may, of course, instead be a windowed envelope.

The transport object is not limited to the envelope W having the enclosure inserted therein.

The transport object may instead be, for example, a paper product such as a postcard, a sheet, or a file, a plate-shaped object such as a corrugated board or a resin plate, a corrugated board package containing an enclosure, or a folder that holds the contents thereof.

Although the belt conveyor 12D includes a single belt, the belt conveyor 12D may instead include plural belts. Alternatively, a roller conveyer or an air track conveyer may be used instead of the belt.

Although the belt conveyor 18 includes two belts, the belt conveyor 18 may instead include a single belt, or three or more belts. Alternatively, a roller conveyer or an air track conveyer may be used instead of the belts.

Although three discharge rollers 54 (two discharge rollers 54 in FIGS. 5 to 12) are arranged with gaps therebetween, the number of discharge rollers 54 is not limited, and may be one.

Although the discharge rollers 54 are supported so as to be movable relative to the upstream transport path 12A in the vertical direction, the discharge rollers 54 may instead be fixed.

The rotational force may be applied to the envelope W after the trailing end portion of the envelope W has passed the discharge rollers 54.

Although the receiving unit 16 transports plural envelopes W in an overlapping state after the orientations of the envelopes W have been changed, the envelopes W may instead be transported in a non-overlapping state.

Although the changing mechanism 20 includes the stopper plate 24 that limits the movement of the envelope W in the transporting direction A, the movement of the envelope W in the transporting direction A may be limited without using the stopper plate 24 by, for example, ejecting fluid (gas) toward the envelope W.

The devices of the enclosing-and-sealing system 60 including the orientation changing apparatus 10 according to the present exemplary embodiment are arranged in an angular U-shape. However, the devices may instead be arranged in an L-shape, a linear shape, or a crank shape in accordance with the conditions of the installation location.

The orientation changing apparatus 10, which has an L-shaped transport system in the present exemplary embodiment, may instead have a linear transport system.

More specifically, the stopper plate 24 may be formed so that the bottom end portion thereof has a function of the correcting unit 26 at the bottom end portion of the straightening plate 22, and the downstream transport path 16A may be arranged so as to extend in the transporting direction A of the upstream transport path 12A.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An orientation changing apparatus comprising:
   a transport path configured to transport a transport object, wherein the transport path includes a space;
   a changing unit configured to change an orientation of the transport object transported toward the space,
      wherein the changing unit is configured to change the orientation in the space by applying a rotational force to the transport object in a direction that crosses a transporting direction in which the transport object is transported; and
   a receiving unit configured to receive the transport object after the orientation of the transport object is changed by the changing unit,
   wherein the changing unit includes:
      a first unit configured to apply an upward rotational force to the transport object transported from the transport path toward the space, the upward rotational force being applied at one side in the direction that crosses the trans porting direction, and
      a second unit configured to apply a downward rotational force to the transport object at other side in the direction that crosses the transporting direction.

2. The orientation changing apparatus according to claim 1, wherein a portion of the transport path that is connected to an upstream side of the space in the transporting direction includes a third unit configured to restrict a vertical movement of a trailing end of the transport object in the transporting direction while a leading end and an intermediate portion of the transport object in the transporting direction are receiving the rotational forces from the first unit and the second unit.

3. An orientation changing apparatus comprising:
   a transport path configured to transport a transport object, wherein the transport path includes a space;
   a changing unit including:
      a first plate-shaped body configured to apply an upward rotational force to the transport object transported toward the space, the upward rotational force being applied at one side in a direction that crosses a transporting direction in which the transport object is transported, and
      a second plate-shaped body configured to apply a downward rotational force to the transport object at other side in the direction that crosses the transporting direction; and
   a receiving unit configured to receive the transport object after the orientation of the transport object is changed by the changing unit.

4. The orientation changing apparatus according to claim 3,
   wherein the first plate-shaped body and the second plate-shaped body of the changing unit each include a proximal portion and a guide portion,
   wherein the guide portion of the first plate-shaped body is shaped so as to be inclined upward with respect to an extension of a transporting surface of the transport path in the transporting direction, and is disposed so as to extend into the space, and
   wherein the guide portion of the second plate-shaped body is disposed so as to extend into the space in a direction that crosses the extension.

5. The orientation changing apparatus according to claim 3, wherein the first plate-shaped body and the second plate-shaped body are both elastic, and are configured to apply the rotational forces to the transport object so that the orientation of the transport object received by the receiving unit is changed by 180 degrees.

6. The orientation changing apparatus according to claim 3, wherein a portion of the transport path that is connected to an upstream side of the space in the transporting direction includes a restricting unit configured to restrict a vertical movement of a trailing end portion of the transport object in the transporting direction while the transport object is receiving the rotational forces from the first plate-shaped body and the second plate-shaped body.

7. The orientation changing apparatus according to claim 3, wherein the first plate-shaped body has a length shorter than a length of the second plate-shaped body.

8. An orientation changing apparatus comprising:
a transport path configured to transport a transport object, wherein the transport path includes a space;
a changing unit configured to change an orientation of the transport object transported toward the space,
wherein the changing unit is configured to change the orientation in the space by applying a rotation force to the transport object in a direction that crosses a transporting direction in which the transport object is transported; and
a receiving unit configured to receive the transport object after the orientation of the transport object is changed by the changing unit,
wherein the changing unit includes a limiting unit configured to limit a rotation of the transport object received by the receiving unit.

9. The orientation changing apparatus according to claim 1, wherein the changing unit includes a stopper unit configured to limit a movement of the transport object in the transporting direction.

10. The orientation changing apparatus according to claim 1, wherein the receiving unit is a portion of a transporting unit configured to transport the transport object downstream in the transporting direction.

11. The orientation changing apparatus according to claim 10, wherein the orientation changing apparatus is configured such that a transport speed at which the transport object is transported from the transport path to the changing unit is may be controlled so that, when a plurality of the transport objects are received by the receiving unit after orientations of the transport objects are changed in midair by the changing unit, a succeeding transport object partially overlaps a preceding transport object.

12. The orientation changing apparatus according to claim 11, wherein the changing unit includes a correcting unit configured to correct an overlapping state of the transport objects received by the receiving unit.

13. An enclosing-and-sealing system comprising:
an envelope transport unit;
an enclosure transport unit;
an inserting unit that configured to insert an enclosure into an envelope;
a sealing unit configured to seal the envelope in which the enclosure is inserted; and
the orientation changing apparatus according to claim 1 configured to transport the envelope sealed by the sealing unit as the transport object.

14. An apparatus comprising:
a transport path configured to transport an object, in a transport direction, to a space;
a first body;
a second body; and
a receiving body,
wherein the first body and the second body are configured to change an orientation of the object being transported toward the space,
wherein the first body is configured to apply a first rotational force to the object transported toward the space, the first rotational force being applied at one side in a direction that crosses the transporting direction,
wherein the second body is configured to apply a second rotational force, in a direction opposite to the first rotational force, to the object at a side opposite the one side in the direction that crosses the transporting direction, and
wherein the receiving body is configured to receive the object after the orientation of the object is changed by the first body and the second body.

15. The apparatus according to claim 14, wherein the first body is plate-shaped, and wherein the second body is plate-shaped.

16. The orientation changing apparatus according to claim 1, wherein the transport object comprises an envelope.

* * * * *